യ,977,051

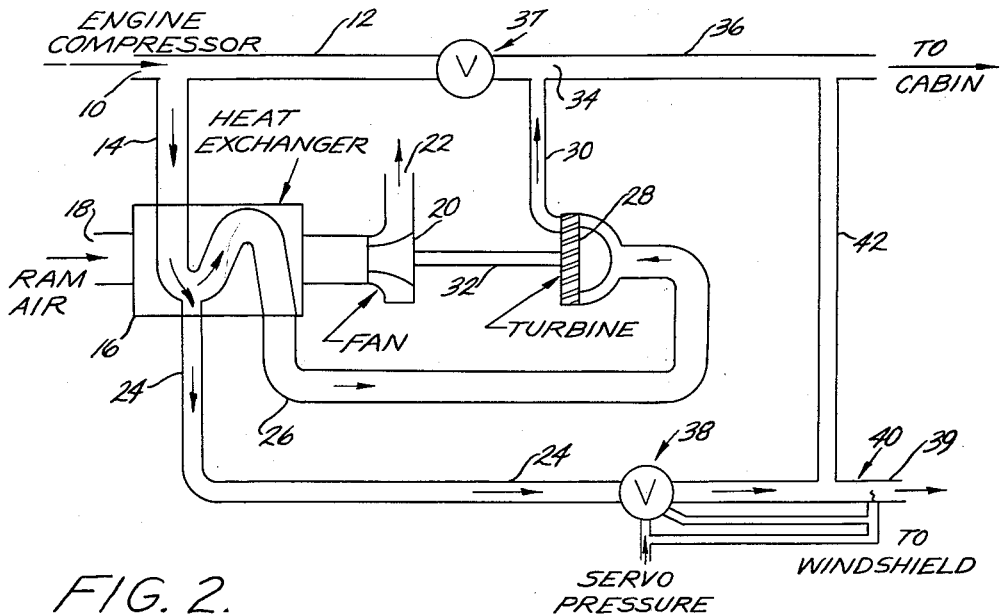

Patented Mar. 28, 1961

2,977,051

TEMPERATURE RESPONSIVE CONTROL VALVE

Thomas P. Farkas, Bloomfield, Otus E. Zuiderhoek, Glastonbury, and Maurice D. Meader, Hartford, Conn., assignors to United Aircraft Corporation, East Hartford, Conn., a corporation of Delaware Original application Nov. 30, 1955, Ser. No. 549,946. Divided and this application Nov. 8, 1957, Ser. No. 695,247

5 Claims. (Cl. 236—82)

This invention relates to a flow control valve for a fluid conduit and, more particularly, to a valve which is operated by means responsive to temperature.

This application constitutes a division of our co-pending application Serial No. 549,946, filed November 30, 1955, now abandoned.

It is a general object of the invention to provide a valve of the aforementioned type which is particularly sensitive to temperature and which is adapted for automatic adjustment in response to temperature change so as to carry out a desired control function.

Another general object of the invention is to adapt a valve structure of the aforedescribed type to control temperature within a fluid system such as an air conditioning system by controlling the flow of fluid therein.

Other, more specific objects as well as advantages of the invention will become apparent from the description taken in connection with the attached drawing showing a presently preferred embodiment of the invention. As will be apparent from the claims forming a part of this specification, the invention is not limited to the embodiment shown and the drawing and description are not to be taken as defining the scope or limits of the invention.

Of the drawing,

Fig. 1 is a schematic view of an aircraft air conditioning system which includes a control valve incorporating the features of the present invention;

Fig. 2 is an enlarged schematic view of the valve and the operating means therefor.

While valve structures incorporating the features of the present invention may find application in a wide variety of fluid systems requiring temperature control, it is believed that the invention can be fully appreciated when the improved temperature responsive control valve is considered in connection with an air conditioning system such as shown in Fig. 1. The said air conditioning system is particularly adapted for an aircraft to supply the aircraft cabin with temperature and pressure conditioned air and to supply another compartment or device on the aircraft with pressurized air at another selected temperature which should remain substantially constant. A more complete disclosure of a system of this general type is contained in the application of Walter C. Shaw entitled "Aircraft Air Conditioning System," Serial No. 549,999, filed November 30, 1955, now Patent Number 2,925,255, issued February 16, 1960.

As set forth in said application and as schematically illustrated in Fig. 1, an air conditioning system of the type under consideration may receive compressed air at an inlet 10 from the aircraft engine compressor or any other convenient source. The inlet 10 is disposed in a conduit 12 which will hereinafter be referred to as the main hot air conduit, this arising from the fact that the compressed air is relatively hot. A conduit 14 in communication with the main hot air conduit 12 extends to a heat exchanger 16 wherein a portion of the hot compressed air is cooled. The heat exchanger 16 may receive ram air as the cooling medium at an inlet 18, the said ram air being drawn through the heat exchanger by a turbine driven fan 20 and then discharged from the system and from the aircraft at an outlet 22. The heat exchanger 16 is preferably of the multi-stage type wherein the hot air is cooled in stages permitting withdrawal of a portion of the compressed air at an early stage in cooling through a conduit 24 which will hereinafter be referred to as a warm air conduit. The compressed air withdrawn at the final stage through a conduit 26 is relatively cool and the conduit 26 will hereinafter be referred to as a cool air conduit. In most air conditioning systems it is desirable to provide for cooling of a portion of the compressed air to a lower temperature than permitted in a ram air heat exchanger such as that shown at 16. To provide for further cooling, the compressed air in the cool air conduit 26 is utilized to drive a turbine 28, thereby giving up more heat in expansion before flowing into a turbine discharge conduit 30 which will hereinafter be referred to as a cold air conduit. As shown in Fig. 1, the turbine 28 can be used to drive the ram air fan 20 by interconnecting the turbine and fan with a drive shaft 32.

The hot air conduit 12 and the cold air conduit 30 communicate at 34 in a conduit 36 extending to the aircraft cabin and supplying the same with pressurized temperature conditioned air. The temperature conditioning may be effected by a valve indicated generally at 37 which will control the amount of flow in the hot air conduit 12, thereby controlling the mixed air temperature in the cabin inlet conduit 36. As more fully explained in the aforesaid Shaw application, control means for the valve 37 can be provided in the cabin so that a pilot can select a temperature for cabin comfort.

The warm air conduit 24 is employed to supply pressurized air for another compartment or device aboard the aircraft, as for example, a windshield de-fogging or de-frosting device having an inlet conduit 39. The temperature of the air flowing to said device can be controlled by mixing selected amounts of warm air from the conduit 24 with cooler air from the cabin inlet conduit, the said cooler air being introduced through an interconnecting conduit 42. That is, the conduit 42 is extended between the cabin inlet conduit 36 and the inlet conduit 39 to mix with warm air from the conduit 24. The amount of warm air introduced and thus the temperature of the mixed air flowing to the de-fogging device is controlled by providing a temperature responsive valve unit 38 in the warm air conduit 24 upstream of the interconnecting conduit 42 and by putting a temperature sensing control unit 40 in the conduit 39 downstream of the interconnecting conduit 42. The valve unit 38 and temperature sensitive control unit 40 incorporate the features of the present invention as will now be explained with reference to Fig. 2.

As shown in Fig. 2, the valve unit 38 includes a throttle valve 44, such as a butterfly valve, which is rotatably disposed in the warm air conduit 24 on the upstream side of the interconnecting conduit 42 and which is connected for rotation with a valve shaft 46. The shaft 46 extends into a housing 48 and is connected as by a link 50 to a stem 52 forming a part of a piston-diaphragm indicated generally at 54. A fluid chamber or air chamber 56 is defined within the housing 48 on one side of the piston-diaphragm 54, and a spring chamber 58 is defined on the other side thereof. A spring 60 is located within the spring chamber and biases the piston-diaphragm within the housing 48 in one direction which, for purposes of consideration here, may be assumed to cause closing of the throttle valve 44. The spring biasing force on the piston-diaphragm 54 is opposed by fluid pressure or air pressure in the chamber 56 tending to cause movement of the piston-diaphragm in the opposite direction which will open the throttle valve. As will be more fully explained hereinafter, the position of the throttle valve within the warm air conduit 24 is adjusted by increasing and decreasing the fluid pressure in the chamber 56.

It is the function of the valve unit 38 to adjust the position of the throttle valve 44 in the warm air conduit 24 whereby to control the amount of flow therethrough so as to maintain a substantially constant temperature in the inlet conduit 39. Obviously, temperature control in the conduit 39 could also be effected by placing the valve unit 38 in the cooler air supply conduit 42 but, preferably, it is disposed in the warm air supply conduit 24.

It is the function of the temperature sensing and control unit 40 to note the temperature in the inlet conduit 39 and to signal the valve unit 38 and to cause corrective action thereby if the temperature departs from a selected level.

The unit 40 includes a bimetallic strip 62 disposed in the conduit 39 so as to be affected by temperature therein. The strip can conveniently be provided in U-shape having one leg 64 which is fixed and another leg 66 which is movable in response to temperature changes. The movable leg 66 is disposed adjacent an outlet nozzle 68 in a servo air or signal conduit 70 and will of its own spring force move toward the said nozzle. Temperature responsive movements of the bimetallic leg 66 will cause it to move in nozzle-opening and nozzle-closing directions, the particular arrangement shown providing for nozzle-opening movement responsive to a temperature increase and nozzle-closing movement responsive to a temperature decrease. Air escaping from the nozzle 68 is discharged from the unit 40 through a vent 72.

The nozzle-closing spring force of the bimetallic leg 66 is supplemented by a spring 74 seated on an adjusting screw 76. Both spring forces are opposed by air pressure within a chamber 78 acting upon a diaphragm 80 which is connected by a link 82 to the leg 66. A passageway or conduit 84 connects the conduit 70 and the chamber 78.

The conduit 70 continuously receives air from a pressurized source through a conduit 85 which contains a flow restrictor 87. Obviously, the pressure within the conduit 70 downstream of the restrictor 87 will vary with the effective size of the opening at the nozzle 68. If the effective nozzle opening is increased, as will occur when the bimetallic leg is displaced as a result of a temperature increase, the pressure in conduit 70 will be decreased. If the effective nozzle opening is decreased, as will occur when the bimetallic leg is displaced as a result of a temperature decrease, the pressure in conduit 70 will increase. With the foregoing in mind, it will be readily understood that by adjusting the spring force on the bimetallic leg 66 so as to adjust its position relative to the nozzle 68 at any specific temperature within the conduit 39, a specific pressure can be selected for the conduit 70. The aforesaid adjustment is, of course, effected by movement of the screw 76. In practice, the screw 76 is adjusted at installation to provide a specific pressure in the conduit 70 for a specific temperature in the conduit 39 and no further adjustment of the said screw is necessary. The pressure in the conduit 70 may be referred to as the signal pressure transmitted from the temperature sensing unit 40 to the valve unit 38. A change in the said signal pressure will result from a change in the temperature within the conduit 39 and will cause the valve unit to take corrective action. The operation of the temperature sensing unit is as follows:

Assume that at a temperature of 100° F. within the conduit 39 the adjusting screw 76 has been moved to set the bimetallic leg 66 in the position shown relative to the nozzle 68. Thus, a specific pressure has been selected for the conduit 70. This same pressure will be present in the diaphragm chamber 78 causing the diaphragm to exert a determinable force on the bimetallic leg 66. Now, if the temperature in conduit 39 increases to 110° F., as may result from a pressure or temperature increase in either or both of the conduits 24 and 42, the leg 66 will swing clockwise to enlarge the effective opening at the nozzle or orifice 68. This will cause an immediate and large drop in pressure within the conduit 70 and the diaphragm chamber 78. With a pressure drop in the chamber 78, the force exerted by the diaphragm 80 on the leg 66 is decreased, whereby the bimetallic leg can swing back toward the nozzle to assume a new position where the diaphragm force and the bimetallic forces (the temperature and spring forces) are balanced. However, in the initial swing of the bimetallic leg, the signal resulting from unbalance of the diaphragm force and bimetallic leg forces has been transmitted to the valve unit 38 and caused the said unit to reposition the throttle valve 44 in the warm air conduit 24. As will be more fully explained, the throttle valve is repositioned to reduce the warm air supply to the inlet conduit 39, whereby to reduce the temperature therein.

If the temperature in the conduit drops from 100° F. to 90° F., the bimetallic leg 66 will move in the nozzle-closing direction to cause a substantial increase in pressure in the servo conduit 70 and diaphragm chamber 78. The increased pressure on the diaphragm will cause it to exert greater force thereby swinging the leg 77 away from the nozzle 68 to a new position where the bimetallic and diaphragm forces are balanced. However, the increased pressure signal in conduit 70 has been transmitted to the valve unit 38 to cause re-positioning of the throttle valve 44 so as to increase warm air flow to the inlet conduit 39. The details of construction of the valve unit 38 whereby it is adapted to operate on temperature responsive pressure signals from the sensing unit 40 will now be described.

As previously mentioned, the valve unit 38 has an air chamber 56 and the throttle valve 44 is adjusted in the warm air conduit 24 by increasing and decreasing the pressure in the chamber. The chamber 56 receives air from any convenient pressurized source which may be connected with a conduit 86. A valve 88 is disposed in the conduit 86 and is selectively positioned to admit air from the conduit 86 to the conduit 85 which supplies the signal conduit 70 and to a conduit 90 which supplies the air chamber 56. The valve 88 may be selectively positioned to close the conduit 86 and to vent the conduits 85 and 90 through a discharge conduit 92. A flow restrictor 94 is disposed in the conduit 90 so that pressure can be varied in the chamber 56 on the downstream side of said restrictor.

The pressure within the chamber 56 is varied by changing the effective opening of a nozzle 96 at the end of a conduit 98 which communicates with the conduit 90 and air chamber 56 to provide outlet means therefor. The effective opening of the nozzle 96 is controlled by an armature 100 which is acted upon by a diaphragm 102 connected to the armature 100 as by a link 104. The diaphragm 102 is disposed in a chamber 106 which communicates by a conduit 108 with the servo or signal conduit 70 extending from the sensing unit 40. The armature 100 is pivoted at 110 so that an increase in signal pressure, thereby increasing diaphragm force, will cause nozzle-closing movement of the armature. A decrease in signal pressure and diaphragm force will permit nozzle-opening movement of the armature.

It will be observed that the armature 100 is engaged by two springs 112 and 114, the former being acted upon by motion transmitting means in the form of a cam 116 secured to the valve shaft 46, and the latter being seated upon an adjusting screw 118. The cam spring 112 biases the armature 100 in a nozzle-closing direction similarly to the diaphragm force and the adjustable spring 114 biases the armature 100 in a nozzle-opening direction as opposed to the diaphragm force.

As to operation of the valve unit 38, it will be quite apparent that an increased pressure signal, transmitted as a result of a temperature decrease at the sensing unit 40, will increase the force of diaphragm 102, thereby swinging the armature 100 in the nozzle-closing direction. This will cause an immediately felt pressure increase in the air chamber 56 causing opening movement of the throttle valve 44. A decreased pressure signal, transmitted from the sensing unit 40 as a result of temperature increase, will decrease the diaphragm force whereby the spring 114 will swing the armature 100 in nozzle-opening direction to decrease pressure in the air chamber 56, whereby the throttle valve 44 will be moved in the closing direction by the spring 60.

Adjustment of the screw 118 to adjust the force of spring 114 is effective to select a specific position of the armature 100 relative to the nozzle 96 at a specific signal or diaphragm pressure. This adjustment of the armature effects a selection for the said specific signal pressure of a specific throttle valve position. Therefore, it becomes quite apparent that the adjusting screw 118 provides means for temperature selection in the conduit 39.

It is important to note that a change in temperature responsive signal pressure in the diaphragm chamber 106 will cause a relatively great change in valve operating pressure within the air chamber 56, this change being reflected in substantial rotation of the throttle valve 44. When the valve shaft 46 rotates or pivots, the cam 116 is likewise rotated to change the effective force of the spring 112. More specifically, when the throttle valve 44 moves in a closing direction, responsive to increased temperature in the conduit 39, the cam 116 moves to increase the effective force of the spring 112. The increased effective force will move the armature 100 in the nozzle-closing direction to increase valve operating air pressure causing the throttle valve to move back in the opening direction until the diaphragm and spring forces on the armature are once again balanced in a new position of the throttle valve.

If the throttle valve 44 is moved in the opening direction, responsive to decreased temperature in the conduit 39, the cam 116 is rotated to decrease the effective force of the spring 112 permitting the spring 114 to move the armature 100 in the nozzle-opening direction which will decrease the valve operating pressure so that the throttle valve will move back in the closing direction. A new valve position is fixed when diaphragm and spring forces on the armature are once again in balance.

From the foregoing description it should be apparent that the sensing unit 40 is adapted to transmit a substantial signal upon the occurrence of a departure from selected temperature and that the valve unit 38 will cause prompt and substantial valve movement upon the receipt of the said signal. The relatively great signal and relatively great valve movements bring about prompt correction of the temperature in the conduit 39. Over-correction is avoided in that "feedbacks" are provided in the sensing unit 40 and in the valve unit 38. That is, the diaphragm 80 in the sensing unit 40 provides a force for re-positioning the pressure controlling bimetallic leg after the signal has been transmitted whereby to discontinue transmission of the large signal and avoid over-correction. It can be said that sensing unit 40 provides for pulse transmission when temperature correction is needed.

The spring 112 provides the feedback force in the valve unit 38. That is, the spring 112 by having an effective force which varies with the throttle valve position, re-positions the pressure controlling armature 100 to re-position the throttle valve after it has been moved to correct the temperature in the conduit 39. It can be said that the valve unit 38 provides for prompt correction of temperature by valve movement and then promptly re-positions the valve to maintain a corrected temperature.

Obviously, when the valve unit 38 and sensing unit 40 are used to control the temperature of air flowing to a device such as a de-fogging device, there is little or no necessity to change the temperature from that initially selected by adjustment of the screw 118. It is desirable to have means for shutting off all flow of warm air to the said device. The air supply valve 88 can be used for that purpose. That is, when the valve 88 is positioned to vent the supply conduits 85 and 90, the valve air chamber 56 will be vented so that the spring 60 will completely close the throttle valve 44 thereby shutting off all warm air flow to the de-fogging device. Only air at cabin temperature will continue to flow. Obviously, valve means forming no part of the present invention can be employed to shut off cabin air flow in the conduit 42 if such valve means are desired.

It will be understood that the valve structure of this invention may be employed where temperature selection is more frequently made. That is, the screw 118, or its equivalent, can be adjusted whenever desired for temperature selection purposes.

The invention claimed is:

1. Flow control means for a fluid conduit comprising a throttle valve disposed in the conduit, pressure responsive valve operating means including an air chamber and operable to move the valve in one direction in response to pressure therein, said air chamber being adapted to receive air under pressure and having outlet means, means biasing said pressure responsive means to move the valve in the opposite direction, a pivoted member movable toward and away from the outlet means to vary the effective opening therein, means resiliently biasing said pivoted member to enlarge the said effective opening, means resiliently biasing said pivoted member to reduce the effective opening, the said last mentioned means being constructed and arranged to exert less force when said valve is moved in said one direction and greater force when said valve is moved in the opposite direction, additional pressure responsive means for biasing said pivoted member to reduce the effective opening, and means for controlling the pressure to said additional pressure responsive means responsive to a condition in the said conduit.

2. Flow control means for a fluid conduit comprising a throttle valve disposed in the conduit, valve operating means having an air chamber and means connected with said valve and responsive to pressure in said chamber to move the valve in one direction, means biasing said pressure responsive means in the opposite direction, means for introducing air under pressure to said chamber, means for controlling pressure in said chamber including outlet means and a pivoted armature movable toward and away from said outlet means to reduce and enlarge the effective opening thereof, means resiliently biasing said armature to enlarge the said effective opening, variable force means arranged to respectively decrease and increase force on the armature to reduce the said effective opening when the pressure responsive means moves in said one direction and the opposite direction, respectively, additional pressure responsive means for biasing said armature to reduce the said effective opening, and temperature sensing means for varying the pressure to said additional pressure responsive means responsive to temperature in the said conduit.

3. Flow control means for a fluid conduit comprising a throttle valve disposed in the conduit, valve operating means having an air chamber provided with means for receiving air under pressure and with outlet means, means connected with the valve and responsive to pressure in said chamber to move the valve in one direction, means biasing said pressure responsive means in the opposite direction, means for controlling pressure in said chamber including a pivoted armature movable toward and away from said outlet means to respectively reduce and enlarge the effective opening thereof, means resiliently biasing said armature away from said outlet means, variable force means biasing said armature toward said outlet means, and means operated by said valve and connected with said variable force means to respectively decrease and increase the force thereof when the valve moves in said one direction and the opposite direction, additional pressure responsive means for biasing said armature toward said outlet means, and temperature sensing means for varying the pressure to said additional pressure responsive means responsive to temperature in said conduit.

4. Flow control means for a fluid conduit comprising a throttle valve rotatably disposed in the conduit, valve operating means having an air chamber provided with means for receiving air under pressure and with outlet means, means connected with the valve and responsive to pressure in said chamber to rotate the same in one direction, means biasing the pressure responsive means to rotate the valve in the opposite direction, means for controlling pressure in said chamber including a pivoted armature movable toward and away from said outlet means to respectively reduce and enlarge the effective opening thereof, means resiliently biasing said armature away from said outlet means, variable force means biasing said armature toward said outlet means, a cam rotatable with said valve and engaging said variable force means to decrease the force thereof when said valve rotates in said one direction and to increase the force thereof when said valve rotates in the opposite direction, additional pressure responsive means for biasing said armature toward said outlet means, and temperature sensing means for varying the pressure to said additional pressure responsive means responsive to temperature in said conduit.

5. Flow control means for a fluid conduit comprising a throttle valve rotatably disposed in the conduit, valve operating means having an air chamber provided with means for receiving air under pressure and with outlet means, means connected with the valve and responsive to pressure in said chamber to open the valve, means biasing said valve toward closed position, means for controlling pressure in said air chamber including a pivoted armature movable toward and away from the outlet means to respectively reduce and enlarge the effective opening thereof, adjustable spring means resiliently biasing said armature away from said outlet means, a spring biasing said armature toward said outlet means, a cam rotatable with said valve and engaging said spring to decrease the force thereof when said valve opens and to increase the force thereof when said valve closes, additional pressure responsive means for biasing said armature toward said outlet means, and temperature sensing means for varying the pressure to said additional pressure responsive means responsive to temperature in said conduit.

References Cited in the file of this patent
UNITED STATES PATENTS

| | | |
|---|---|---|
| 722,251 | Powers | Mar. 10, 1903 |
| 1,101,901 | Braemer | June 30, 1914 |
| 1,764,799 | Kysor | June 17, 1930 |
| 2,179,450 | Gorrie | Nov. 7, 1939 |
| 2,223,712 | Ziebolz | Dec. 3, 1940 |
| 2,258,366 | Otto | Oct. 7, 1941 |
| 2,536,184 | Johnson | Jan. 2, 1951 |
| 2,668,014 | Lund | Feb. 2, 1954 |
| 2,732,849 | Rosenberger | Jan. 31, 1956 |
| 2,817,318 | Mackenzie | Dec. 24, 1957 |